(12) United States Patent
Wilson et al.

(10) Patent No.: US 7,188,608 B2
(45) Date of Patent: Mar. 13, 2007

(54) RAIL PRESSURE SAMPLING BEFORE FUEL INJECTION EVENTS

(75) Inventors: Jeremy J. Wilson, Peoria, IL (US); Eric E. Sollenberger, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 592 days.

(21) Appl. No.: 10/014,654

(22) Filed: Dec. 11, 2001

(65) Prior Publication Data

US 2003/0106534 A1    Jun. 12, 2003

(51) Int. Cl.
    *F02M 37/04* (2006.01)
(52) U.S. Cl. ..................... 123/456; 123/494
(58) Field of Classification Search .............. 123/500, 123/501, 357, 456, 494, 446, 467; 73/119 A
    See application file for complete search history.

(56) References Cited

U.S. PATENT DOCUMENTS

| | | | |
|---|---|---|---|
| 4,257,260 A * | 3/1981 | Beatson et al. ........... 73/119 A |
| 4,337,650 A * | 7/1982 | Brandt ..................... 73/119 A |
| 5,357,912 A * | 10/1994 | Barnes et al. .............. 123/357 |
| 5,564,391 A | 10/1996 | Barnes et al. |
| 5,988,143 A * | 11/1999 | Dietz et al. ................ 123/458 |
| 6,085,727 A * | 7/2000 | Nakano ..................... 123/447 |
| 6,349,702 B1 * | 2/2002 | Nishiyama .................. 123/456 |
| 6,484,696 B2 * | 11/2002 | Barnes et al. .............. 123/446 |
| 6,513,371 B1 * | 2/2003 | Jett et al. ................... 73/119 A |
| 6,581,574 B1 * | 6/2003 | Moran et al. ............... 123/497 |

* cited by examiner

*Primary Examiner*—Carl S. Miller
(74) *Attorney, Agent, or Firm*—Liell & McNeil

(57) ABSTRACT

In common rail fuel injection systems, a sensed rail pressure is used to determine control signals to produce desired injection characteristics. Because rail pressure fluctuates, especially during cold start procedures, and because the rail pressure must be sensed before the injection event to be controlled, the accuracy of the timing and quantity of the injection event can be compromised if the rail pressure at the start of the injection event is different from the sensed rail pressure. In order to produce more accurate fuel injection characteristics, the rail pressure is sensed after the end of control signal for an immediately preceeding injection event but at least a predetermined time before the start of control signal for a succeeding injection event. Since the rail pressure is sensed close in time to the succeeding injection event but with adequate time to do control signal determination calculations, the accuracy in quantity and timing of the succeeding injection event can be improved because the quality of the sensed rail pressure is improved.

16 Claims, 4 Drawing Sheets

Fig. 5.

| CYL # | CRANK TEETH SENSOR A NUMBER | CAM TEETH SENSOR B NUMBER | θ | CYL # | CRANK TEETH SENSOR A NUMBER | CAM TEETH SENSOR B NUMBER | θ |
|---|---|---|---|---|---|---|---|
| #1 TDC | 4 | | 0/720 | #6 TDC | 40 | | 360 |
| | | | 5 | | | | 365 |
| | 5 | | 10 | | 41 | | 370 |
| | | 21 | 15 | | | 9 | 375 |
| | 6 | | 20 | | 42 | | 380 |
| | | | 25 | | | | 385 |
| | 7 | | 30 | | 43 | | 390 |
| | | | 35 | | | | 395 |
| | 8 | | 40 | | 44 | | 400 |
| CAM MARKER CLY 5 | | 22 | 45 | CAM MARKER CLY 2 | | 10 | 405 |
| CRANK MARKER CLY 5 | 9 | | 50 | CRANK MARKER CLY 2 | 45 | | 410 |
| | | | 55 | | | | 415 |
| | 10 | | 60 | | 46 | | 420 |
| | | | 65 | | | | 425 |
| | 11 | | 70 | | 47 | | 430 |
| | | 23 | 75 | | | 11 | 435 |
| | 12 | | 80 | | 48 | | 440 |
| | | | 85 | | | | 445 |
| | 13 | EXTRA TOOTH | 90 | | 49 | | 450 |
| | | | 95 | | | | 455 |
| | 14 | | 100 | | 50 | | 460 |
| | | 0 | 105 | | | 12 | 465 |
| | 15 | | 110 | | 51 | | 470 |
| | | | 115 | | | | 475 |
| #5 TDC | 16 | | 120 | #2 TDC | 52 | | 480 |
| | | | 125 | | | | 485 |
| | 17 | | 130 | | 53 | | 490 |
| | | 1 | 135 | | | 13 | 495 |
| | 18 | | 140 | | 54 | | 500 |
| | | | 145 | | | | 505 |
| | 19 | | 150 | | 55 | | 510 |
| | | | 155 | | | | 515 |
| | 20 | | 160 | | 56 | | 520 |
| CAM MARKER CLY 3 | | 2 | 165 | CAM MARKER CLY 4 | | 14 | 525 |
| CRANK MARKER CLY 3 | 21 | | 170 | CRANK MARKER CLY 4 | 57 | | 530 |
| | | | 175 | | | | 535 |
| | 22 | | 180 | | 58 | | 540 |
| | | | 185 | | | | 545 |
| | 23 | | 190 | | 59 | | 550 |
| | | 3 | 195 | | | 15 | 555 |
| | 24 | | 200 | | 60 | | 560 |
| | | | 205 | | | | 565 |
| | 25 | | 210 | | 61 | | 570 |
| | | | 215 | | | | 575 |
| | 26 | | 220 | | 62 | | 580 |
| | | 4 | 225 | | | 16 | 585 |
| | 27 | | 230 | | 63 | | 590 |
| | | | 235 | | | | 595 |
| #3 TDC | 28 | | 240 | #4 TDC | 64 | | 600 |
| | | | 245 | | | | 605 |
| | 29 | | 250 | | 65 | | 610 |
| | | 5 | 255 | | | 17 | 615 |
| | 30 | | 260 | | 66 | | 620 |
| | | | 265 | | | | 625 |
| | 31 | | 270 | | 67 | | 630 |
| | | | 275 | | | | 635 |
| | 32 | | 280 | | 68 | | 640 |
| | | 6 | 285 | | | 18 | 645 |
| CAM MARKER CLY 6 | 33 | | 290 | CAM MARKER CLY 1 | 69 | | 650 |
| CRANK MARKER CLY 6 | | | 295 | CRANK MARKER CLY 1 | | | 655 |
| | 34 | | 300 | | 70 | | 660 |
| | | | 305 | | | | 665 |
| | 35 | | 310 | | 71 | | 670 |
| | | 7 | 315 | | | 19 | 675 |
| | 36 | | 320 | | 0 | | 680 |
| | | | 325 | | | | 685 |
| | 37 | | 330 | | 1 | | 690 |
| | | | 335 | | | | 695 |
| | 38 | | 340 | | 2 | | 700 |
| | | 8 | 345 | | | 20 | 705 |
| | 39 | | 350 | | 3 | | 710 |
| | | | 355 | | | | 715 |

RAIL PRESSURE SAMPLING BEFORE FUEL INJECTION EVENTS

TECHNICAL FIELD

The present invention relates generally to electronically controlled common rail fuel injection systems, and more particularly to rail pressure sampling in a common rail fuel injection system.

BACKGROUND

Common rail fuel injection systems come in many forms. For instance, a common rail fuel injection system might maintain fuel at injection pressure levels in the common rail, and then inject at that pressure by respective fuel injectors connected to the common rail. In another example, a separate actuation fluid, such as lubricating oil, is maintained in a common rail at a medium pressure level. This actuating fluid is then supplied to individual injectors which utilize the actuation fluid to hydraulically pressurize fuel within the individual injectors to injection pressure levels. In still another example, fuel is maintained in a common rail at a medium pressure level. The individual fuel injectors connected to such a rail have the ability to inject directly at the medium pressure level, or utilize the medium pressure fuel to hydraulically intensify the pressure of the fuel to be injected from the fuel injector. In all of these cases, the fuel injection rate is strongly a function of the rail pressure. Thus, as one would expect, the determination of injection control signals are currently based at least in part upon an estimated rail pressure. The accuracy of any given fuel injection event is strongly related to the accuracy of a rail pressure estimate used in determining the injection control signals that will be used in an attempt to deliver those desired injection characteristics.

Engineers have observed that rail pressure can vary substantially between injection sequences but also within an injection sequence itself. In many cases, these fluctuations in rail pressure can exceed 15% of the average rail pressure, especially, and possibly to a larger extent, during cold starting. These fluctuations in rail pressure can be attributable to a number of phenomena. For instance, localized rail pressure fluctuations can be attributable to pressure waves bouncing around in the common rail due to such events as the opening and closing of various valves. More significantly, however, is the fact that in most cases the common rail is steadily supplied with fluid from a high pressure pump, but fluid is consumed from the rail by the injectors in brief gulps. Thus, one could expect rail pressure to drop with each injection event, and then recover between events. Much more accurate delivery timings and quantities can be achieved if the rail pressure is known at the start of each injection event. Unfortunately, it is currently difficult to instantaneously obtain an accurate rail pressure measurement, and in the same instant generate control signals based upon that rail pressure measurement, and again in that same instant carryout the determined control signal. Thus, one problem associated with improving delivery and timing accuracy of fuel injection events is the problem of accurately determining what the rail pressure will be at the beginning of each one of those events.

In most systems, a single CPU processor is used by the electronic control module to control the engine, which includes the fuel injection system. Since the processor can only do one thing at a time and because the processor is generally occupied with processing data in regular periodic intervals and controlling injector drivers during an injection event, only a limited amount of time is available to determine desired injection characteristics, determine control signals and set up for a subsequent injection event, especially at high speeds and loads. In fact, under some higher speed and load conditions, the time available may be so short as to require the electronic control module to calculate control signals for more than one injection event for two different cylinders. In all of these cases, rail pressure is sensed sometime before the determination of control signals for some subsequent injection event. For instance, in some cases rail pressure is sensed at regular intervals, such as every so many milliseconds. Unfortunately, such a strategy can result in an inaccurate rail pressure being used to determine control signals since the rail pressure measurement might be taken a relatively long period of time before the subsequent injection event. In other cases, a rail pressure measurement is taken at the start of current for an injection event, and then that rail pressure measurement is used as an estimate for determining control signals for one or more later injection events. While such a strategy avoids the possibility of a processor interrupt at an inopportune time, the rail pressure data can be relatively stale since the rail pressure measurement used in calculating control signals is based upon a rail pressure that occurred at the beginning of a preceeding injection event.

The present invention is directed to these and other problems associated with determining rail pressure in a common rail fuel injection system.

SUMMARY OF THE INVENTION

In one aspect, a method of improving accuracy of a fuel injection event in a common rail fuel injection system includes a step of sensing rail pressure at least a predetermined time before a start of control signal for a succeeding injection event but after an end of control signal of an immediately preceeding injection event. The succeeding injection event control signals are determined based at least in part on the sensed rail pressure.

In another aspect, a fuel injection system includes a common rail containing a pressurized fluid. A plurality of fuel injectors have inlets fluidly connected to the common rail. An electronic control module is operably coupled to the fuel injectors and includes a rail pressure determinator operable to determine rail pressure at least a predetermined time before a start of control signal for a succeeding injection event but after an end of control signal for an immediately preceeding injection event.

In still another aspect, an article includes a computer readable data storage medium. A rail pressure determinator is stored on the medium and is operable to determine rail pressure at least a predetermined time before a start of control signal for a succeeding injection event but after an end of control signal for an immediately preceeding injection event. A control signal determination algorithm is stored on the medium and is operable to determine a succeeding injection event control signal based at least in part on a sensed rail pressure generated by the rail pressure determinator.

BRIEF DESCRIPTION OF THE DRAWINGS

FIG. 5 is a table of cylinder data, crank data and cam shaft data verses engine angle according to one aspect of the present invention.

DETAILED DESCRIPTION

Figure 1:
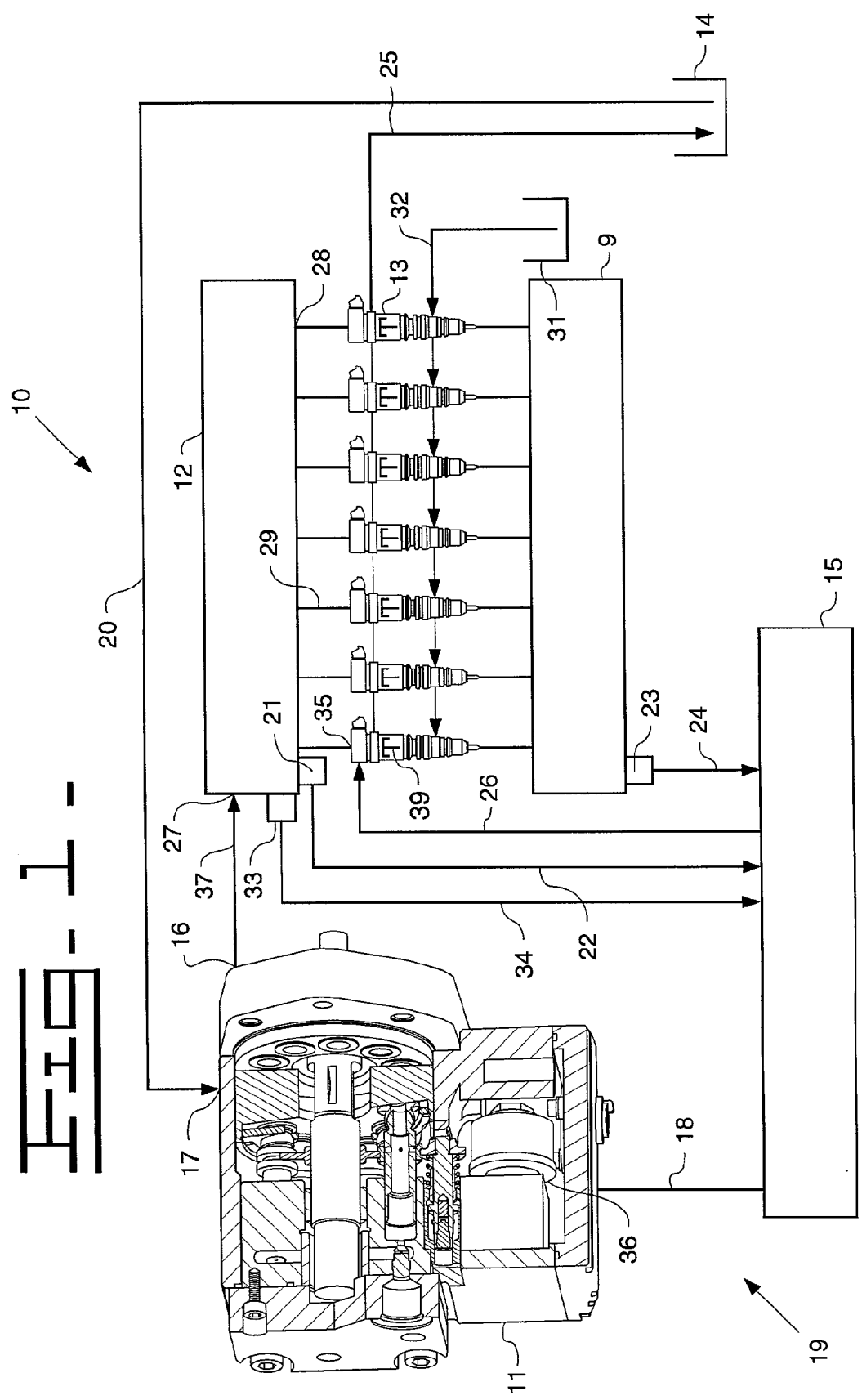
FIG. 1 is a schematic illustration of an engine with a common rail fuel injection system according to one example embodiment of the present invention.

Referring to FIG. 1, an internal combustion engine 9, which is preferably a compression ignition engine, includes a common rail fuel injection system 10 that includes a pump 11, a high pressure common rail 12 and a plurality of fuel injectors 13. Pump 11 can be any suitable high pressure pump, but is preferably a fixed displacement sleeve metered variable delivery axial piston pump of the type generally described in co-owned U.S. Pat. No. 6,035,828. Those skilled in the art will appreciate that any suitable pump, such as a variable angle swash plate pump whose output is controlled via an electrical signal, could be substituted for the illustrated pump without departing from the intended scope of the present invention. In addition, fixed delivery pumps could also be utilized with the inclusion of some means to control rail pressure. For instance, in some previous common rail fuel injection systems, a fixed delivery pump is used, and a separate rail pressure control valve is utilized to control rail pressure by leaking a portion of the pressurized fluid in the common rail back to drain. In the illustrated example, the common rail contains an amount of pressurized actuating fluid, which is preferably engine lubricating oil, but could be any other suitable fluid, such as fuel.

Fuel injectors 13 are preferably hydraulically actuated fuel injectors of the type manufactured by Caterpillar, Inc. of Peoria, Ill., but could be any suitable common rail type fuel injector, including but not limited to pump and line common rail fuel injectors, or possibly a Bosch type common rail fuel injector of the type described in "Heavy Duty Diesel Engines—The Potential of Injection Rate Shaping for Optimizing Emissions and Fuel Consumption", presented by Messrs Bernd Mahr, Manfred Dürnholz, Wilhelm Polach, and Hermann Grieshaber, Robert Bosch GmbH, Stuttgart, Germany at the 21st International Engine Symposium, May 4–5, 2000, Vienna, Austria. Thus, those skilled in the art will appreciate that, depending upon the structure of the common rail fuel injection system, another fluid, such as diesel fuel (Bosch) could be used in the common rail without departing from the intended scope of the present invention. Preferably, fuel injectors 13 include a hydraulically driven pressure intensifier 39.

In the preferred embodiment illustrated, variable delivery pump 11 includes an inlet 17 connected to a low pressure reservoir/oil pan 14 via a low pressure supply line 20. An outlet 16 of variable delivery pump 11 is fluidly connected to an inlet 27 of high pressure common rail 12 via a high pressure supply line 37. Common rail 12 includes a plurality of outlets 28 that are fluidly connected to fuel injector inlets 35 via a plurality of high pressure supply lines 29. After being used by the respective fuel injectors 13, the used oil returns to low pressure reservoir 14 via an oil return line 25 for recirculation. The system also includes, in this example embodiment, a fuel tank 31 that is fluidly connected to fuel injectors 13 via a fuel supply line, which is preferably at a relatively low pressure relative to that in high pressure common rail 12.

In order to control fuel injection system 10 and the operation of engine 9, an electronic control module 15 receives various sensor inputs, and uses those sensor inputs and other data to generate desired injection characteristics and control signals. These signals are usually in the form of a control current level, control signal duration and timing, to control the various devices, including the variable delivery pump 11 and the fuel injectors 13. In particular, a pressure sensor 21 senses pressure somewhere in the common rail 12 and communicates a pressure signal to control module 15 via a sensor communication line 22. The electronic control module uses the pressure sensor signal to estimate the pressure in the common rail 12. A speed sensor 23 which is suitably located on engine 9, communicates a sensed speed signal to electronic control module 15 via a sensor communication line 24. A temperature sensor 33, which can be located at any suitable location in common rail fuel injection system 10, but preferably in rail 12, communicates an oil temperature sensor signal to electronic control module 15 via a sensor communication line 34. Like the other sensors, electronic control module 15 uses the signal to estimate the oil temperature in fuel injection system 10. The electronic control module preferably combines the temperature estimate with other data, such as an estimate of the grade of the oil in system 10, to generate a viscosity estimate for the oil. Those skilled in the art will appreciate that viscosity estimates can be gained by other means, such as by pressure drop sensors, viscosity sensors, etc. In other common rail systems, viscosity is less of a concern.

Electronic control module 15 controls the activity of fuel injectors 13 in a conventional manner via an electronic control signal communicated via injector control lines 26, only one of which is shown. A typical control signal for an injection event is characterized by the timing at which the control signal is initiated and the duration of that signal. In addition, the current level may change during the event, such as starting at a high pull-in level and dropping to a lower hold-in level. Nevertheless, the present invention is not limited to those systems in which fuel injection quantity is a function of the control signal duration. Thus, in most instances and in the example embodiment, the electronic control module determines and controls current levels, durations and timings.

Electronic control module 15 also controls a pump output controller 19 that includes an electro hydraulic actuator 36 and a control communication line 18. Preferably, electro hydraulic actuator 36 controls the output of variable delivery pump 11 in proportion to an electric current supplied via control communication line 18 in a conventional manner. For instance, in the preferred embodiment, electro hydraulic actuator 36 moves sleeves surrounding pistons in pump 11 to cover spill ports to adjust the effective stroke of the pump pistons, and hence the output from the pump. The pump output controller 19 could be analog, but preferably includes a digital control strategy that updates all values in the system at a suitable rate, such as every so many milliseconds. The pump control signal generated by electronic control module 15 is preferably a function of the desired rail pressure, the estimated rail pressure and the estimated consumption rate of the entire fuel injection system 10 and whatever other devices, such as engine brake actuators, that are connected to the rail.

At regular and/or irregular intervals, the electronic control module determines a set of desired injection characteristics for a succeeding injection sequence. Each injection sequence includes one or more injection events, and the electronic control module determines a desired timing for each injection event and a desired quantity of fuel to inject in each injection event. The desired injection sequence characteristics are preferably determined at an appropriate time before a succeeding injection sequence. Also, at some time between the preceding injection event and a succeeding injection event, a rail pressure measurement is taken via rail pressure sensor 21. The control signal characteristics to be determined include a timing delay between the start of current and the start of injection, and a control signal duration. These delay and duration variables are determined in a conventional manner, such as by utilizing equations and/or look up tables. In the case of the illustrated fuel injection system, the timing delay is preferably calculated using rail pressure and temperature as independent variables. The duration signal is preferably calculated using a lookup table that uses rail pressure and desired fuel injection quantity as independent variables. Thus, in order to produce the desired injection event at the desired timing, current to the individual injector is initiated at a timing that corresponds to the desired injection event timing as advanced by the determined delay. The control signal continues for the determined duration in order to cause the injector to inject fuel in a manner that corresponds to the desired injection quantity. It is simply not practical to measure the rail pressure at the start of current and then do the necessary lookups regarding duration. It is not possible to measure the rail pressure at start of current and use it to determine the delay between start of current and start of injection. A more practical option is to measure the pressure after the previous cylinder events are complete, but before setting up the first injection event on the current cylinder.

Those skilled in the art will recognize that it takes a finite amount of time to do the necessary lookups and/or calculations to determine the start of current/start of injection delay as well as the control signal duration. In addition, after these control signal characteristics are determined, it also takes a finite amount of time to set up the injector drivers with those control signal values. Thus, in one aspect, the pressure measurement according to the present invention occurs at least a predetermined time before the start of current for the first injection event of the succeeding injection sequence. In other words, the pressure measurement should be taken with adequate time to determine the injection control signal characteristics and set up the injector drivers with the same before the start of control signal timing for the succeeding injection event.

After determining the minimum amount of time before the start of control signal for a succeeding injection event in which to take the pressure measurement, one should preferably determine what time window is available for taking the pressure measurement across the engine/injectors expected operating range. Those skilled in the art will appreciate that at high engine speeds and loads, injection durations are relatively long and come close in time in successive cylinder events. This exercise can reveal whether the invention can be implemented by taking the rail pressure at a predetermined timing before top dead center across the entire engine operating range, or whether two or more strategies should be implemented depending upon engine operating conditions.

Figure 4:
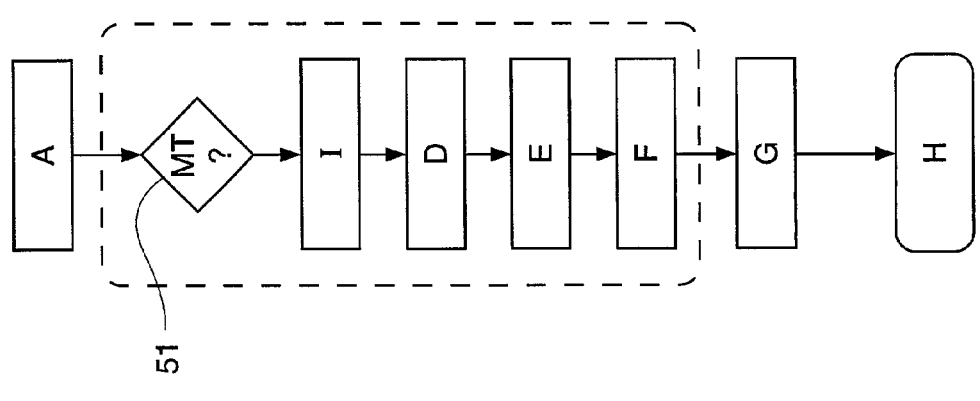
FIG. 4 is a software flow diagram according to another aspect of the present invention.

Referring now to FIGS. 4 and 5, one possible methodology of implementing the present invention is illustrated. In this embodiment, the engine's hardware is modified to include a marker on some rotational element, such as a marker tooth on a crank shaft and/or a cam shaft. These marker(s) are set to pass a marker reader at a preset angle before top dead center for each cylinder of the engine. For instance, FIG. 5 shows an example table for including appropriate markers to trigger a rail pressure sampling event at a fixed timing that is about 70° before top dead center for each cylinder. With this basic strategy, the ECM triggers a rail pressure measurement when it senses crank teeth 9, 21, 33, 45, 57 and 69. FIG. 4 shows the software algorithm strategy for implementing this embodiment of the present invention. In box A, an injection characteristic determinator determines the desired injection characteristics (quantity and timing) for each injection event in the succeeding injection sequence. A marker reader algorithm 51 triggers a processor interrupt I when the predetermined marker tooth rotates past a marker reader that is of conventional construction and appropriately located on the engine. At the following box D, the electronic control module samples and filters a rail pressure measurement. Using the desired injection characteristics and the sampled rail pressure, the delay between start of current and start of injection is determined with appropriate look ups and/or calculations in box E. Preferably, this timing offset is determined from a 3D map lookup using oil temperature and rail pressure as independent variables. Next, the injection duration is preferably determined using a 3D—lookup map using desired fuel quantity and rail pressure as independent variables in box F. In box G, the injector driver set up algorithm sets up the injector drivers for the succeeding injection event in a conventional manner, such as by placing the determined injection control signal characteristics in appropriate memory locations in or associated with the electronic control module. Finally, in box H the electronic control module executes the injection event, such as by initiating current to the selected injector at the determined start of current timing.

Figure 3:
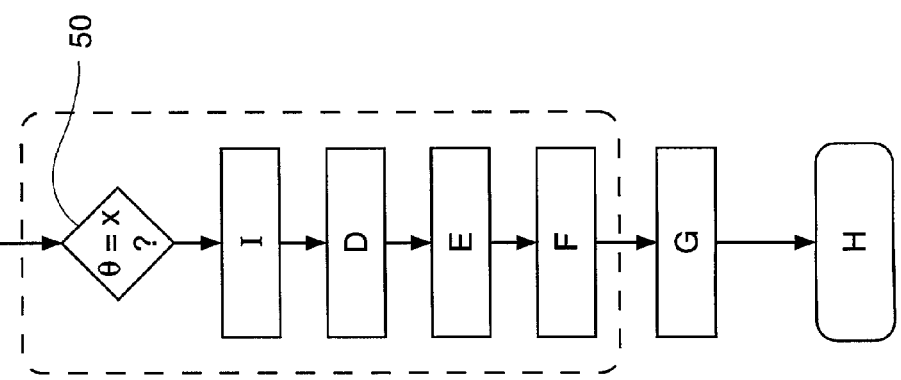
FIG. 3 is a software flow diagram according to one aspect of the present invention.

Referring now to FIG. 3, an embodiment of the invention is illustrated that requires only software changes rather than software and hardware changes as in the FIGS. 4–5 embodiment. Like the other embodiment, the process begins with an injection characteristic determinator A that determines desired injection characteristics in a conventional manner. Next, in box B, a pressure sensing event determinator can be a fixed constant, or possibly be mapped against one or more engine variables. For instance, the pressure sensing event determinator could be the functional equivalent of the marker teeth of the FIGS. 4–5 embodiment by setting the pressure sensing event to occur at a fixed and predetermined timing before top dead center for each cylinder. Alternatively, the pressure sensing event determinator might be mapped against engine operating conditions, such as speed and load, to determine the angle before top dead center that a rail pressure measurement is taken. Thus, in this later strategy, the timing at which the rail pressure measurement is taken could be different depending upon different engine speeds and loads, for instance.

Pressure sensing event determinator box B could be as simple as a fixed constant throughout the engine's operating range or as sophisticated as desired to suit any individual application of the present invention. An engine angle determinator 50 then determines whether the engine is at the angle determined by pressure sensing event determinator B. When the engine is at the predetermined angle X as determined by the pressure sensing event determinator B, a processor interrupt I is initiated. As in the previously described embodiment, a rail pressure determinator D takes a rail pressure sample, conducts appropriate filtering, if any, and provides the same to the duration control signal determinator F in the control signal timing determinator G. After the control signal characteristics are determined, the injector drivers are set up in a conventional manner. Finally, the injection event is executed in a conventional manner at step H.

In still another embodiment, the ECM might determine a desired angle at which to take the rail pressure measurement. Next, the ECM determines which marker tooth that desired angle corresponds to. It then commands a rail pressure measurement when the designated marker tooth is used. Such a strategy permits the marker tooth strategy to be made dynamic through appropriate software changes.

Those skilled in the art will appreciate that the various algorithms and look up tables, etc. are preferably stored on a computer readable data storage medium. For instance, in the case of the present invention, the rail pressure determinator, the control signal determination algorithm, the rail pressure sensing event timing determinator, the engine angle determinator and marker reader algorithm, if any, are preferably stored on a computer readable data storage medium, which may be a portion of the electronic control module, be located in memory accessible to the electronic control module, or stored on some other computer readable device before being transferred to the electronic control module. Preferably, the entire array of algorithms used by the electronic control module are stored on a conventional computer readable data storage medium and then transferred to the electronic control module in a conventional manner.

INDUSTRIAL APPLICABILITY

The present invention finds potential application in virtually any electronically controlled common rail fuel injection system. Such systems include, but are not limited to, pump and line systems with a pressurized fuel rail, hydraulically actuated systems that utilize a pressurized oil rail, and other systems that allow for injection directly from a pressurized fuel rail or utilize that pressurized fuel to intensify fuel to even higher injection pressure levels. In all of these systems, the ability to inject fuel in a predictable manner requires that the rail pressure be known with accuracy and timeliness. By implementing hardware and/or software changes, the present invention facilitates the sensing of rail pressure after the end of control signal for an immediately preceeding injection event but at least a predetermined time before a start of control signal for a succeeding injection event. The predetermined time before the start of control signal for the succeeding injection event preferably corresponds to the minimum amount of time required by the electronic control module to do the necessary look ups and calculations to convert a desired set of injection characteristics and a rail pressure measurement into control signal characteristics, and set up the system, including injection drivers, with those control signal characteristics. By taking the rail pressure measurement in this available window, the rail pressure measurement is preferably taken between rail pressure recovery events. In other words, not only is the rail pressure measurement taken relatively close in time to the succeeding injection event but also preferably after rail pressure has stabilized after recovering from a pressure drop due to a preceeding injection event. In most instances, the common rail is continuously supplied with pressurized fluid from a pump, but fluid is consumed from the rail in relatively brief gulps. Thus, the present invention preferably takes the rail pressure measurement a sufficient amount of time after the preceeding injection event that rail pressure in the common rail has recovered and stabilized. Nevertheless, it is within the scope of the present invention to take the rail pressure measurement while pressure fluctuations are occurring, such as during a rail pressure recovery event.

Preferably, the invention is implemented by commanding a rail pressure sensing event at a predetermined timing before top dead center for each individual cylinder. This timing could be fixed, or more preferably determined as a function of known variables such as speed, load and temperature. This can be accomplished by examining engine and injector performance across the engine's operating range, especially at high loads and speeds. If this examination reveals there is a timing window available between injection events that includes a fixed angle before top dead center across the engine's operating range it might be desirable to implement the invention by taking the rail pressure measurement at that fixed timing before top dead center across the entire engine's operating range. As previously described, such a strategy can be accomplished with hardware, such as by including a marker tooth or other marker on a rotating portion of the engine, such as the crank or cam shaft, or through the software means such that the electronic control module continuously monitors the current crank angle and commands the rail pressure sensor measurement at the predetermined fixed timing. In other instances, it might be desirable to command the pressure measurement at different timings depending upon specific conditions such as the engine speed, temperature and the start of a succeeding injection event. For instance, instead of using a fixed timing before top dead center at which to take all rail pressure measurements, it might be desirable to determine a desired timing for taking a rail pressure measurement based at least in part upon a timing of a succeeding injection event, temperature and engine speed. While such a strategy would likely be more complex and require additional memory storage capability for mapping the rail pressure sensing event timing, such a strategy could permit the rail pressure measurement event to occur as close in time as possible to the start of current for a succeeding injection event across the engine's entire operating range. This dynamic strategy could be implemented with software alone or by a modified marker tooth strategy. In the later, the ECM would determine which marker tooth corresponds to the desired measurement angle, and then command the measurement when that marker tooth is sensed. In general, the closer in time to the injection event that the rail pressure is taken, the more accurate the determined control signals will produce the desired injection characteristics.

Figure 2:
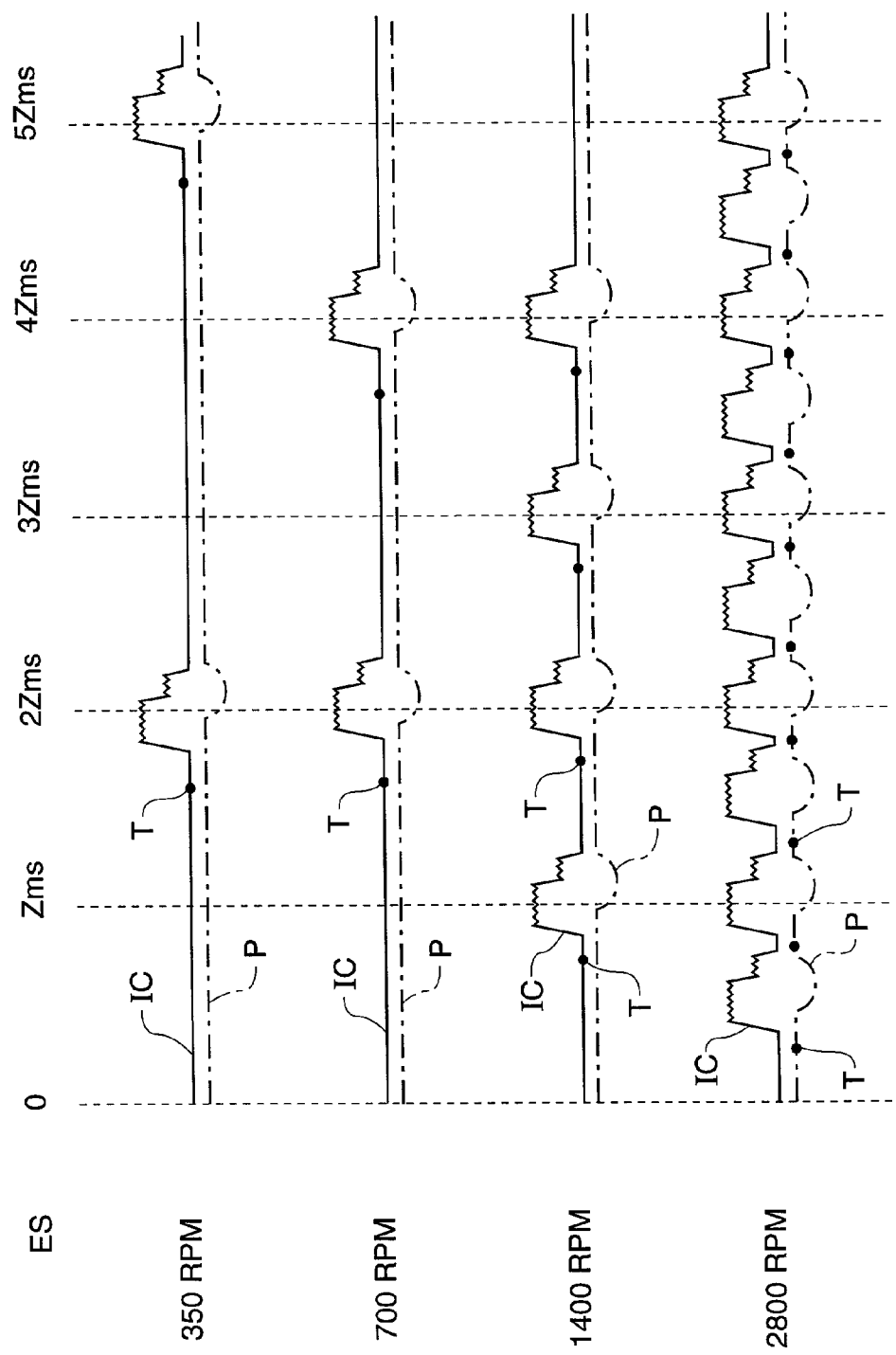
FIG. 2 are graphs of control signal current and rail pressure verses time for four different engine speeds according to one aspect of the present invention.

Referring now to FIG. 2, a graph of injector current IC and rail pressure P are graphed against time for four example engine speeds according to an implementation of the present invention according to either the FIG. 3 or FIG. 4 embodiments. The vertical dotted lines of FIG. 2 reflect the electronic control module processor clock interval Z milliseconds, and demonstrates that the rail pressure sensor timing T is tied more to engine crank angle than the regular periodicity of the electronic control module 15 (FIG. 1). These graphs are also useful in illustrating that a rail pressure recovery event occurs in conjunction with each injection event.

The rail pressure sensing event timing T occurs at least a predetermined time before the start of current for the succeeding injection event. This predetermined time allows the electronic control module to do the necessary lookups and setups to determine and implement control signal characteristics based at least in part upon the sensed rail pressure measurement. Although the graphs in FIG. 2 show only a single injection event each injection sequence, those skilled in the art will appreciate that the present invention is also applicable to injection sequences that include two or more injection events. Thus, the present invention contemplates scenarios in which a single rail pressure measurement is used to set up a plurality of injection events in a succeeding injection sequence, or possibly a rail pressure sensing event between injection events within a single injection sequence, provided enough time is available to do necessary lookups and/or calculations. FIG. 2 also shows each injection event being initiated with a high pull-in current and then dropping to a hold-in current level.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of improving accuracy of a fuel injection event in a common rail fuel injection system, comprising the steps of:
   sensing rail pressure at a predetermined fixed engine angle before top dead center for an engine cylinder, which is before a start of control signal for a succeeding injection event for an injector of the engine cylinder, but after an end of control signal of an immediately preceding injection event for a different injector of a different engine cylinder; and
   determining a succeeding injection event control signal for the injector of the engine cylinder based at least in part on the sensed rail pressure from the sensing step.

2. The method of claim 1 wherein said sensing step is performed between rail pressure recovery events.

3. A method of improving accuracy of a fuel injection event in a common rail fuel injection system, comprising the steps of:
   determining a timing at which to perform a rail pressure sensing event;
   sensing rail pressure at least a predetermined time before a start of control signal for a succeeding injection event for an injector of an engine cylinder, but after an end of control signal of an immediately preceding injection event for a different injector of a different engine cylinder;
   determining a succeeding injection event control signal for the injector of the engine cylinder based at least in part on the sensed rail pressure from the sensing step; and
   said determining step includes a step of setting the timing of a rail pressure sensing event at a fixed predetermined angle before top dead center for the engine cylinder.

4. The method of claim 3 wherein said setting the timing step includes a step of providing a marker on a rotating component of an engine.

5. A method of improving accuracy of a fuel injection event in a common rail fuel injection system, comprising the steps of:
   sensing rail pressure at least a predetermined time before a start of control signal for a succeeding injection event for an injector of an engine cylinder, but after an end of control signal of an immediately preceding injection event for a different injector of a different engine cylinder;
   determining a succeeding injection event control signal for the injector of the engine cylinder based at least in part on the sensed rail pressure from the sensing step; and
   said sensing step is performed a fixed predetermined angle before top dead center of the engine cylinder.

6. A fuel injection system comprising:
   a common rail containing a pressurized fluid;
   a plurality of fuel injectors with inlets fluidly connected to said common rail; and
   an electronic control module operably coupled to said fuel injectors and including a rail pressure determinator operable to determine rail pressure at a fixed predetermined engine angle before top dead center of an engine cylinder, which is before a start of control signal for a succeeding injection event for an injector of the engine cylinder, but after an end of control signal of an immediately preceding injection event for a different injector of a different engine cylinder, and being operable to determine a succeeding injection event control signal for the injector based at least in part on a single rail pressure value, which is the determined rail pressure.

7. The fuel injection system of claim 6 wherein said electronic control module includes a rail pressure sensing event timing determinator.

8. A fuel injection system comprising:
   a common rail containing a pressurized fluid;
   a plurality of fuel injectors with inlets fluidly connected to said common rail;
   an electronic control module operably coupled to said fuel injectors and including a rail pressure determinator operable to determine rail pressure at a rail pressure sensing event timing, which is at least a predetermined time before a start of control signal for a succeeding injection event for an injector of an engine cylinder, but after an end of control signal of an immediately preceding injection event for a different injector of a different engine cylinder;
   said electronic control module includes a rail pressure sensing event timing determinator; and
   said rail pressure sensing event timing determinator includes an engine angle determinator operable to determine when an engine is at a predetermined fixed angle before top dead center for the engine cylinder.

9. The fuel injection system of claim 8 wherein said engine angle determinator includes a marker reader algorithm.

10. The fuel injection system of claim 8 wherein said predetermined fixed angle is based at least partly on succeeding injection event data and engine speed.

11. The fuel injection system of claim 10 wherein said electronic control module includes a map of said predetermined fixed angle versus succeeding injection event timing and engine speed.

12. An article comprising:
   a computer readable data storage medium;
   a rail pressure determinator stored on the medium and being operable to determine rail pressure at a predetermined fixed engine angle, which is before a start of control signal for a succeeding injection event for an injector of an engine cylinder, but after an end of control signal of an immediately preceding injection event for a different injector of a different cylinder; and
   a control signal determination, algorithm stored on the medium and being operable to determine a succeeding injection event control signal for the injector of the engine cylinder based at least in part the sensed rail pressure generated by said rail pressure determinator.

13. The article of claim 12 including a rail pressure sensing event timing determinator stored on said medium.

14. An article comprising:
a computer readable data storage medium;
a rail pressure determinator stored on the medium and being operable to determine rail pressure at a rail pressure sensing event timing, which is at least a predetermined time before a start of control signal for a succeeding injection event for an injector of an engine cylinder, but after an end of control signal of an immediately preceding injection event for a different injector of a different engine cylinder; and
a control signal determination algorithm stored on the medium and being operable to determine a succeeding injection event control signal for the injector of the engine cylinder based at least in part on a sensed rail pressure generated by said rail pressure determinator;
a rail pressure sensing event timing determinator stored on said medium; and
said rail pressure sensing event timing determinator includes an engine angle determinator operable to determine when an engine is at a predetermined fixed angle before top dead center for the engine cylinder.

15. The article of claim 14 wherein said engine angle determinator includes a marker reader algorithm.

16. The article of claim 15 including a map of said predetermined fixed angle versus succeeding injection event timing and engine speed stored on said medium.

* * * * *